Feb. 29, 1944.　　　J. D. DANFORTH　　　2,342,923
ISOMERIZATION OF HYDROCARBONS
Filed Feb. 28, 1942
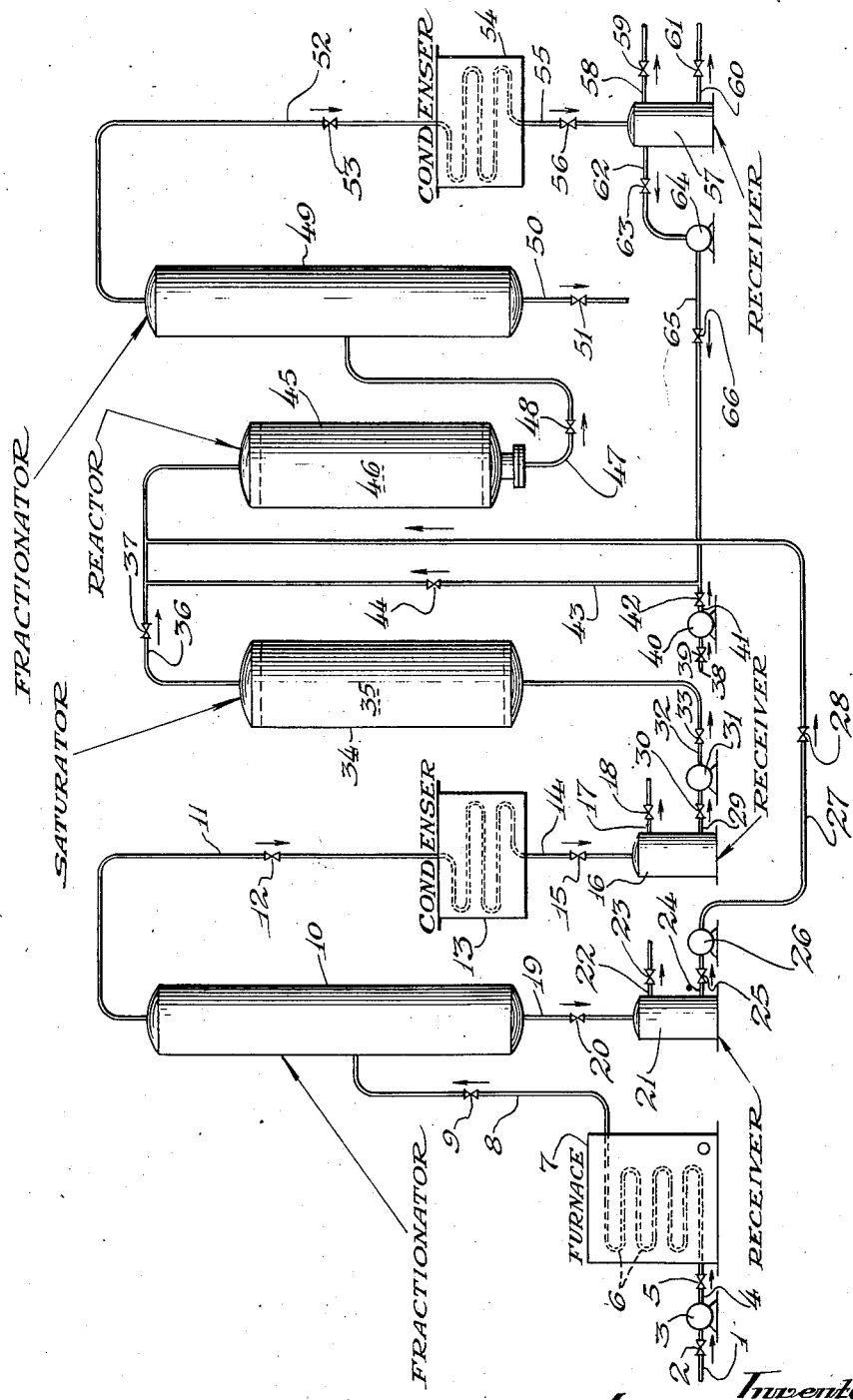

Patented Feb. 29, 1944

2,342,923

UNITED STATES PATENT OFFICE 2,342,923

ISOMERIZATION OF HYDROCARBONS

Joseph D. Danforth, Chicago, Ill., assignor to Universal Oil Products Company, Chicago, Ill., a corporation of Delaware Application February 28, 1942, Serial No. 432,749

4 Claims. (Cl. 260—683.5)

This is a continuation-in-part of my co-pending application Serial No. 373,961, filed January 10, 1941.

This invention relates to the treatment of essentially saturated hydrocarbons such as paraffins or cycloparaffins to effect isomerization and other conversion thereof and includes the treatment of hydrocarbon fractions of petroleum consisting essentially of paraffins and naphthenes which occur in varying proportions in straight run gasolines and naphthenes.

The invention is more particularly concerned with isomerization processes employing granular metal halide catalysts of the Friedel-Crafts type by a particular mode of continuous operation which insures production of high yields of isomerized products per unit weight of metal halide catalyst.

Isomerizing hydrocarbons and particularly paraffin hydrocarbons to produce their more highly branched counterparts has received considerable impetus on the recognition by the petroleum industry that branched chain paraffin hydrocarbons are considerably more reactive than the straight chain compounds and that in the case of normally liquid hydrocarbons boiling within the ordinary motor fuel range the antiknock values of the branched chain compounds are higher than the corresponding values of the straight chain compounds. The increase in antiknock value is particularly noticeable in the case of the more highly branched compounds although improvements are noticed with even a mild degree of branching.

The catalysts most generally employed in effecting rearrangement of the saturated hydrocarbon molecules into those of a more compact structure are those of the Friedel-Crafts type and most particularly aluminum chloride which is not only sufficiently active at moderate temperatures but which is more or less available at moderate cost. Other aluminum halides such as, for example, aluminum bromide are more active than aluminum chloride but their high cost precludes their general use. Of the metal halides broadly included in the so-called Friedel-Crafts group of catalysts very few have outstanding activity in hydrocarbon conversion reactions since nearly all those other than aluminum chloride require high temperatures to effect a given hydrocarbon conversion and at these temperatures the isomerization reaction is not selective but is accompanied by undesirable side reactions. Among alternatively employable Friedel-Crafts catalysts may be mentioned the chlorides of zinc, zirconium and iron either alone or in admixture with aluminum chloride. The Friedel-Crafts type catalysts are usually used in granual form in hydrocarbon conversion reactions and may be deposited on or absorbed in the pores of granular supports. It is essential to the full attainment of the catalytic effectiveness of Friedel-Crafts catalysts that definite amounts of hydrogen halide be present since apparently there is very little activity in the absence of definite amounts of a hydrogen halide. These halides are definitely added as such rather than produced in situ by the action of water or steam on the metal halides since this method of production gradually consumes the metal halide and makes periodic replacement imperative.

Recent developments in isomerizing hydrocarbons with granular metal halide catalysts have included the use of granular metal halides in fixed beds to which hydrocarbons to be isomerized are passed continuously in admixture with a hydrogen halide in regulated amounts followed by fractionation of the total products with separation of desired isomer fractions, rejection of undesirably heavy products, recycling of hydrogen halide and material capable of further efficient isomerizing treatment. The present process comprises improvements in this type of operation which make for greater yields per unit weight of catalyst and generally more efficient operation.

In one specific embodiment the present invention comprises a process for isomerizing hydrocarbon mixtures consisting of lower boiling and higher boiling constituents which consists in fractionating a hydrocarbon mixture into said lower and higher boiling fractions, passing the lower boiling fractions through a bed of granular metal halide to dissolve a portion thereof, combining a solution of metal halide with the heavier hydrocarbon fractions and a hydrogen halide, introducing the combined materials into a reactor containing granular relatively inert packing material, fractionating the products from the reactor to produce fixed gases comprising essentially a hydrogen halide, an isomerized product of desired boiling range and heavier fractions, returning said hydrogen halide to further use in the isomerization step.

In order to indicate more definitely the improvement process which constitutes the present invention a characteristic method of operation will be described in connection with the attached drawing which shows diagrammatically by the use of interconnected conventional units in general side elevation an arrangement of apparatus in which the process has been conducted.

Referring to the drawing a hydrocarbon charge such as, for example, a gasoline or naphtha of certain limited characteristics is introduced to the plant shown by way of line 1 containing valve 2 to pump 3 which discharges through line 4 containing valve 5 through a heating element 6 arranged in a furnace setting 7 to receive heat therefrom. The stock charged has preferably a considerable percentage of hydrocarbons boiling below about 100° F. which fractions are separated and used to dissolve metal halide catalysts. The preferred charging stocks are furthermore those of a straight run character containing minimum amounts of olefins and aromatics although the effect of the latter will be minimized when lower boiling fractions are used as described since benzol, the lowest boiling aromatic is absent from such low boiling fractions.

During passage through heating element 6 the mixture of hydrocarbons is heated to a temperature sufficient to insure its subsequent fractionation into lower and higher boiling fractions and after heating, the heated charge passes through line 8 containing valve 9 to a fractionator 10 of suitable design and capacity for effecting the desired separation. The vapors of the light fractions pass through vapor line 11 containing valve 12 and are condensed during passage through a condenser 13 from which the condensed liquid flows through line 14 containing valve 15 to an intermediate receiver 16 having a conventional gas release line 17 containing valve 18. The heavier fraction comprising the remainder of the charge passes through line 19 containing valve 20 from the bottom of fractionator 10 to intermediate receiver 21 which is also provided with a gas release line 22 containing valve 23 for the removal of any fixed gases present incidentally at this point.

In accordance with the present invention the light hydrocarbon fraction in receiver 16 is used to dissolve a metal halide such as, for example, aluminum chloride from a granular bed of material and thus the low boiling liquid fraction in receiver 16 is withdrawn by way of line 29 containing valve 30 to a pump 31 and discharged into line 32 containing valve 33 upward to a saturator 34 containing a bed of granular metal halide in central section 35. While the flow is indicated as being upward through the saturator, downflows may also be practiced. In the case of the upward flow shown there may be some mechanical carry over of the metal halide as well as the solution effect but usually there is no serious disadvantage inherent in this operation.

The light fraction carrying dissolved and entrained metal halide passes through line 36 containing valve 37 and into isomerizing reactor 45 which contains a bed of granular packing material which may be definitely inert and act merely as a filter or which may possess absorbent or catalytic properties. Prior to the admission of the stream of lower boiling hydrocarbons containing metal halide into reactor 45 regulated amounts of a hydrogen halide and the higher boiling fractions of the original hydrocarbon charge are introduced. Thus, a hydrogen halide may be supplied to pump 40 by way of line 38 containing a valve 39 and discharged through line 41 containing valve 42 and thence into line 43 containing valve 44 and into line 36. Recycled hydrogen halide may also enter line 43 from recycle line 65 as will be subsequently described. The higher boiling fraction of the original hydrocarbon charge is taken from receiver 21 by way of line 24 containing valve 25 leading to pump 26 and discharged through line 27 containing valve 28 and leading into line 36.

By thus avoiding contact of the heavier portions of hydrocarbon mixture with a metal halide in the saturator, the formation of metal halide-hydrocarbon addition complexes is prevented or at least minimized since in cases of straight run gasolines there is very little decomposition when low boiling paraffins such as butanes, pentanes and hexanes are contacted with metal halide such as aluminum chloride, particularly in the absence of hydrogen halide such as hydrogen chloride or water. Such low boiling fractions of straight run gasolines contain minimum amounts of olefins and no aromatics and consequently, there is no chance for the formation of complexes of olefins and aromatics at this point and the bed of metal halide particles remains clean for long periods of time. The process of the present invention includes an operation in which a straight run gasoline is stabilized in fractionator 10 to remove all or a portion of the butanes which it contains, and the butanes are used to dissolve the metal halide and carry it into the reactor in regulated amounts. The present process also offers a control in that controlled amounts of lower boiling fractions may be passed through the saturator to dissolve and carry varying amounts of the metal halide into the isomerizing reactor. The solubility of metal halides such as aluminum chloride will vary with the boiling range and chemical composition of low boiling hydrocarbon fractions and the process may be operated, for example, by first employing a fraction with a relatively low end point and then increasing the amount of fraction passing through the saturator by taking over a fraction of higher end point.

In reactor 45 the main reactions of isomerization are brought about on the total combined hydrocarbon feed after the addition of regulated amounts of a hydrogen halide. The amounts of hydrogen halide such as hydrogen chloride up to about 20 mole per cent or higher of the hydrocarbon mixture charged may be used, and hydrogen may be added to the reaction zone if desired although means for this have not been indicated in the drawing. Entering metal halide deposits upon the granular filter and isomerization is effected to any desired extent. As the deposited metal halide becomes gradually contaminated by the formation of metal halide-hydrocarbon complexes, fresh metal halide is supplied by the incoming stream of light fraction so that isomerization in reactor 45 is continuous up to the point of complete saturation of the absorbent granules with metal halide addition complexes, at which time the reactor would have to be cleaned out. The granular contact materials which may be used in reactor 45 may comprise a number of different materials such as, for example, relatively inert substances such as Raschig rings, Berl saddles, crushed porcelain silica or firebrick, activated carbon, activated alumina, bauxite, magnesia, etc. While these materials may be used alternatively their action will not be exactly equivalent since they vary in inherent catalytic action, and in both chemical and absorbent properties.

Temperatures employed in the saturator and reactor may be varied over a wide range depending upon the character of the hydrocarbon materials passing through them. In the saturator and reactor temperatures may vary from about 50 to about 200° C. when dealing with ordinary straight run gasoline or naphtha fractions and this temperature may be maintained by heat added by way of any of the entering materials. Thus, the light fractions may be passed through the saturator at a temperature found essential for absorbing the required amounts of metal halide for insuring the desired degree of isomerization in the reactor and the remainder of the heat for the reactor supplied by heating the heavier fractions which do not pass through the saturator. The heating elements for the light and heavy fractions have been omitted from the drawing in the interest of simplicity. If desired the saturator and reactor may be externally heated although this is usually a less desirable mode of operation.

The reaction products from reactor 45 pass through line 47 containing valve 48 to a final fractionator 49 which can be adapted to any arrangement of fractionating equipment adequate for effecting the desired fractionation of products. As shown in the drawing the desired isomerized fraction along with gases including a hydrogen halide pass through line 52 containing valve 53 to a condenser 54 and the condensed liquid and uncondensed gases pass through line 55 containing valve 56 to a receiver 57 for isomerized product. The receiver has a draw line 60 containing valve 61 for the removal of isomerized material and line 58 containing valve 59 for the venting of gas accumulations. Heavy hydrocarbon materials and metal halide-hydrocarbon complexes may be withdrawn from fractionator 49 through line 50 containing valve 51 and, if desired, the complexes may be separated and reused in further isomerization treatment along with fresh metal halide in so far as they possess sufficient catalytic activity.

Although the detail is not indicated in the drawing the fractionating zone may include further means for separating the hydrogen halide from the fractionator and returning it to the isomerizing zone. Thus, a portion or all of the gas separated in receiver 57 and comprising essentially hydrogen chloride or other hydrogen halides may be passed through line 62 containing valve 63 to recycling pump or compressor 64 which discharges the gas into line 65 containing valve 66 and thence to line 43.

The following data are introduced to indicate the type of results obtainable when operating in accordance with the process of the present invention although it is not intended that the proper scope of the invention should be limited in exact accordance therewith.

A straight-run gasoline comprising essentially only paraffin and naphthene hydrocarbons is treated for the improvement of its antiknock properties in accordance with the process described in connection with the drawing. The gasoline is fractionated to remove a lighter portion boiling below 100° F. and this lower-boiling fraction is used as a carrier liquid for dissolving aluminum chloride and carrying the dissolved aluminum chloride into a reactor containing granular alumina, the remaining higher-boiling fractions of the gasoline along with hydrogen chloride being introduced at this point. Temperature employed in the aluminum chloride supply zone is maintained at about 212° F., while the temperature in the isomerizing reactor is maintained at 195° F. A pressure of 500 pounds per square inch is maintained on both the aluminum chloride supply zone and the reaction zone. Hydrogen chloride is introduced to the reaction zone at a rate corresponding to about 12 moles per 100 moles of gasoline charged to the plant.

The octane number (motor method) of the gasoline charge is 40 and the octane number of the gasoline produced in the process is found to be 70 by the same method of testing. There is a 95 per cent yield of product based on the liquid charge and it is found possible to treat 15 gallons of gasoline per pound of aluminum chloride.

I claim as my invention:
1. A process for treating paraffinic distillates boiling in the gasoline range which comprises separating the distillate into a light fraction boiling below about 100° F. and a heavier fraction, contacting said light fraction in liquid form with a metal halide insomerizing catalyst under conditions such as to dissolve a portion of said catalyst in the light fraction, commingling said heavier fraction and a hydrogen halide with the solution of catalyst in the light fraction, passing the resultant mixture through a reaction zone containing a solid packing material and depositing catalyst from said solution onto the packing material, and subjecting said fractions to isomerizing conditions during their passage through the reaction zone.

2. A process for treating paraffinic distillates boiling in the gasoline range which comprises separating the distillate into a light fraction boiling below about 100° F. and a heavier fraction, contacting said light fraction in liquid form with aluminum chloride under conditions such as to dissolve aluminum chloride in the light fraction, commingling said heavier fraction and hydrogen chloride with the solution of aluminum chloride in the light fraction, passing the resultant mixture through a reaction zone containing a solid packing material and depositing aluminum chloride from said solution onto the packing material, and subjecting said fractions to isomerizing conditions during their passage through the reaction zone.

3. A process for treating paraffinic distillates boiling in the gasoline range which comprises separating the distillate into a light fraction boiling below about 100° F. and a heavier fraction, passing said light fraction in liquid form through a body of solid metal halide isomerizing catalyst under conditions such as to dissolve a portion of said catalyst in the light fraction, commingling said heavier fraction and a hydrogen halide with the solution of catalyst in the light fraction, passing the resultant mixture through a reaction zone containing a solid packing material and depositing catalyst from said solution onto the packing material, and subjecting said fractions to isomerizing conditions during their passage through the reaction zone.

4. The process as defined in claim 3 further characterized in that said body comprises aluminum chloride.

JOSEPH D. DANFORTH.